United States Patent
Yang et al.

(10) Patent No.: US 9,207,364 B2
(45) Date of Patent: Dec. 8, 2015

(54) OPTICAL LENS AND METHOD OF MAKING THE SAME

(75) Inventors: Ching-Shan Yang, Tainan (TW); Wu-Li Wang, Tainan (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 630 days.

(21) Appl. No.: 13/527,315

(22) Filed: Jun. 19, 2012

(65) Prior Publication Data

US 2013/0250404 A1    Sep. 26, 2013

(30) Foreign Application Priority Data

Mar. 22, 2012    (TW) .............................. 101109932 A

(51) Int. Cl.
*G02B 5/20*    (2006.01)
*G02B 3/00*    (2006.01)
*G02B 5/00*    (2006.01)

(52) U.S. Cl.
CPC . *G02B 3/00* (2013.01); *G02B 5/005* (2013.01); *G02B 5/208* (2013.01)

(58) Field of Classification Search
None
See application file for complete search history.

(56) References Cited

U.S. PATENT DOCUMENTS

| | | | |
|---|---|---|---|
| 7,738,180 B2* | 6/2010 | Igarashi | 359/656 |
| 2005/0036214 A1* | 2/2005 | Jewers et al. | 359/738 |
| 2006/0033833 A1* | 2/2006 | Hurwitz et al. | 348/340 |
| 2009/0027777 A1* | 1/2009 | Kyoya | 359/581 |
| 2009/0185291 A1* | 7/2009 | Tsuchiya et al. | 359/738 |
| 2011/0080487 A1* | 4/2011 | Venkataraman et al. | 348/218.1 |
| 2013/0141771 A1* | 6/2013 | Pei | 359/275 |

FOREIGN PATENT DOCUMENTS

TW    200538761 A    12/2005
WO    2011019067 A1    2/2011
WO    2011136138 A1    11/2011

OTHER PUBLICATIONS

Office Action of corresponding TW application, published on Feb. 2, 2015.

* cited by examiner

*Primary Examiner* — Derek S Chapel
(74) *Attorney, Agent, or Firm* — Baker & McKenzie LLP

(57) ABSTRACT

An optical lens includes a lens member and two shade layers on opposite sides of the lens member. The lens member respectively has a lens portion on each side thereof. Each shade layer has an aperture above the corresponding lens portion of the lens member to serve the function of aperture. A method uses optical lithography technique to make such optical lens in a fast way, and the shade layers will have a strong bonding strength with the lens member.

7 Claims, 5 Drawing Sheets

OPTICAL LENS AND METHOD OF MAKING THE SAME

BACKGROUND OF THE INVENTION

1. Field of the Invention

The present invention relates generally to an optical device, and more particularly to an optical lens and a method of making the same.

2. Description of the Related Art

In recent days, consumer electronic devices, such as cell phone, laptop, tablet, and PDA, are equipped with lens module to catch images. These consumer electronic devices are made as smaller and lighter as possible for user to carry and operate in an easy way so that lens modules and the optical lens mounted in the lens module are asked smaller and lighter accordingly.

In order to reduce the size, the conventional optical lens usually includes the aperture therein. As shown in FIG. 1, the lens 3 has a glass substrate 60, a chrome shade layer 70, and two lens members 80. The shade layer 70 is provided on a side 60a of the glass substrate 60. The shade layer 70 has an aperture 70a at a center thereof. The lens members 80 respectively are provided on the shade layer 70 and on the other side 60b of the glass substrate 60. The shade layer 70 serves the function of aperture so that the lens module may have a small size.

A conventional method of making such lens 3 includes the following steps:

A. Deposit chromium on the glass substrate 60 by chemical vapor deposition (CVD) to form the shade layer 70 on the side 60a.

B. Coat a photoresist layer on the shade layer 70.

C. Developing the photoresist layer by lithography development to form a pattern on the photoresist layer.

D. Etch the shade layer 70 through the photoresist layer to form an aperture 70a at a center thereof.

E. Remove the photoresist layer; and

F. Attach two lens members 80 on the shade layer 70 and the other side 60b of the glass substrate 60.

It will take a long time in chemical vapor deposition to deposit the chromium layer with a predetermined thickness. The following steps of the conventional method take much time as well so that it will take a very long time to make one lens by the conventional method. Besides, chromium is an inorganic material which has a weak bonding strength with the glass substrate 70. This will reduce the yield rate of manufacture of the lenses. In conclusion, there still are some places to be improved.

SUMMARY OF THE INVENTION

The primary objective of the present invention is to provide a method of making a lens, which makes thin lenses in a fast way.

According to the objective of the present invention, an optical lens includes a lens member and a shade layer on a side of the lens member. The lens member respectively has a lens portion on each side thereof. The shade layer has an aperture above the lens portion of the lens member to serve the function of aperture.

In an embodiment, the shade layer is made of organic material.

In an embodiment, the optical lens further includes an opaque shade layer on the other side of the lens member, wherein the shade has an aperture above the lens portion.

In an embodiment, the infrared rays cut film is on the lens member opposite to the shade layer.

In an embodiment, the infrared rays cut film is between the lens member and the shade layer.

In an embodiment, the lens member further has a marginal portion surrounding the lens portion, and the shade layer covers the marginal portion and a part of the lens portion.

The present invention further provides a method of making an optical lens, which includes the following steps:

A. Coat a shade layer on a side of a lens member, wherein the lens member respectively has a lens portion on opposite sides, and the shade layer covers the entire lens portion;

B. Define the shade layer with an unnecessary portion and a necessary portion, wherein the unnecessary portion is above the lens portion; and C. Remove the unnecessary portion of the shade layer to form an aperture.

In an embodiment, the shade layer is made of photoresist, and lithography development is performed to form the unnecessary portion and the necessary portion on the shade layer.

In an embodiment, the shade layer is made of an organic material.

In an embodiment, the method of the present invention further includes the step of coating an infrared rays cut film on the lens member before the step A.

In an embodiment, the shade layer is coated on the infrared rays cut film.

In an embodiment, the shade layer and the infrared rays cut film are on opposite sides of the lens member.

In an embodiment, each side of the lens member is coated with the shade layer.

In an embodiment, the lens member further has a marginal portion surrounding the lens portion; the shade layer covers the marginal portion and a part of the lens portion.

Therefore, the present invention provides the optical lens to be manufactured in a fast way, and the shade layer has a strong bonding strength with the lens member.

DETAILED DESCRIPTION OF THE INVENTION

Figure 1:
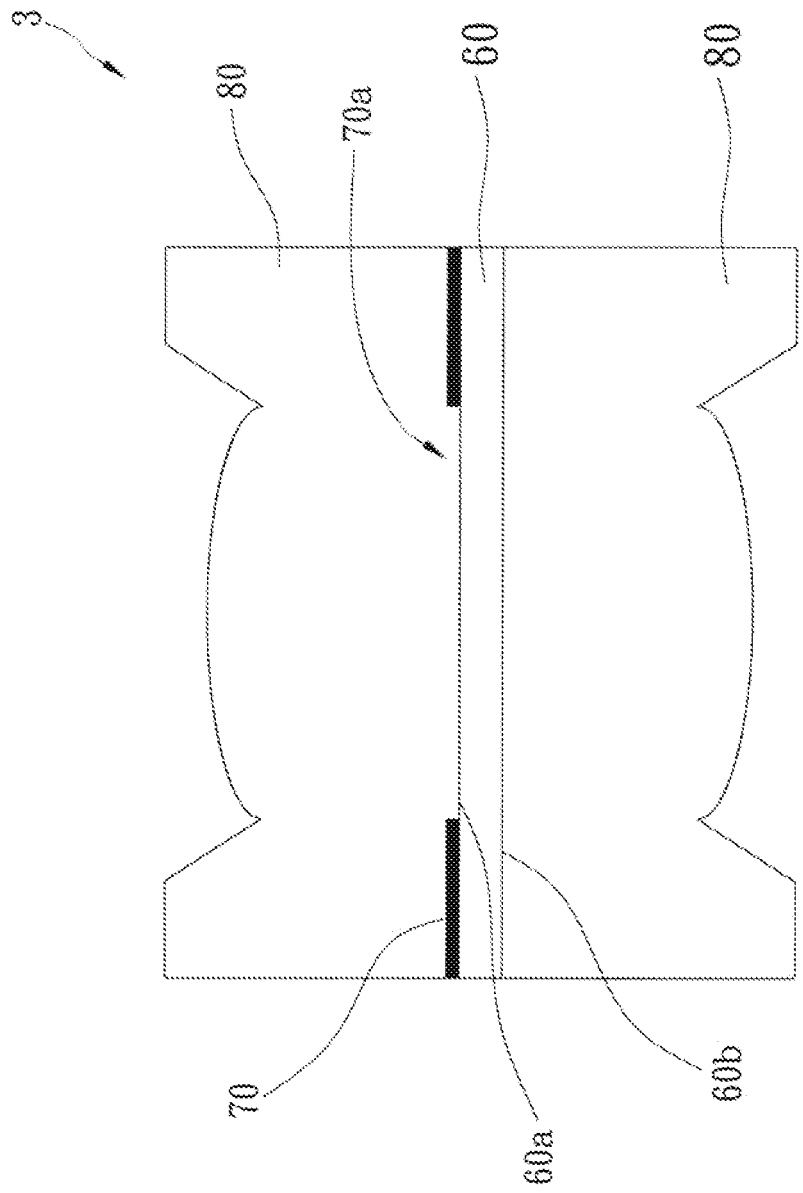
FIG. 1 is a sectional view of the conventional optical lens.
Figure 2:
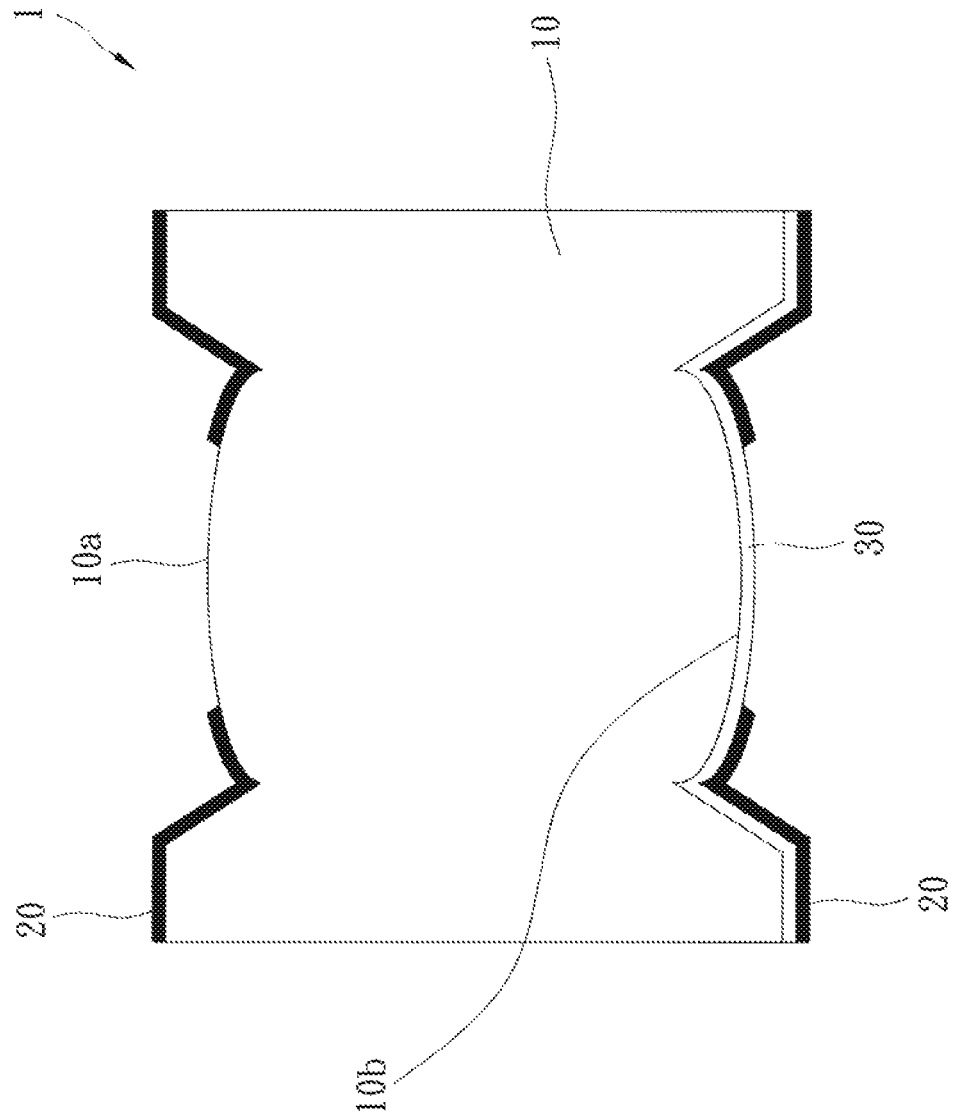
FIG. 2 is a sectional view of the optical lens of a preferred embodiment of the present invention.
Figure 3:
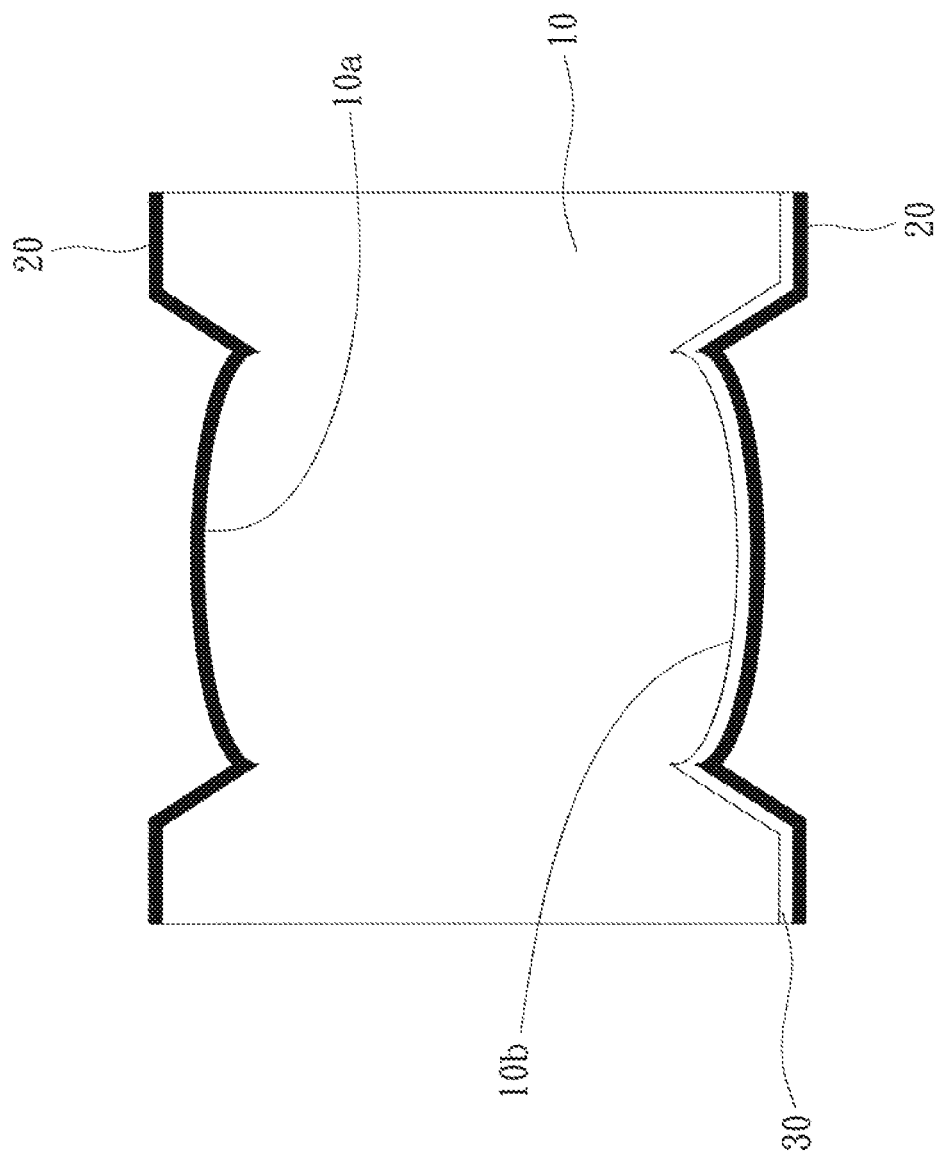
FIG. 3 is a sketch diagram of performing the step A of the method of the preferred embodiment of the present invention.
Figure 4:
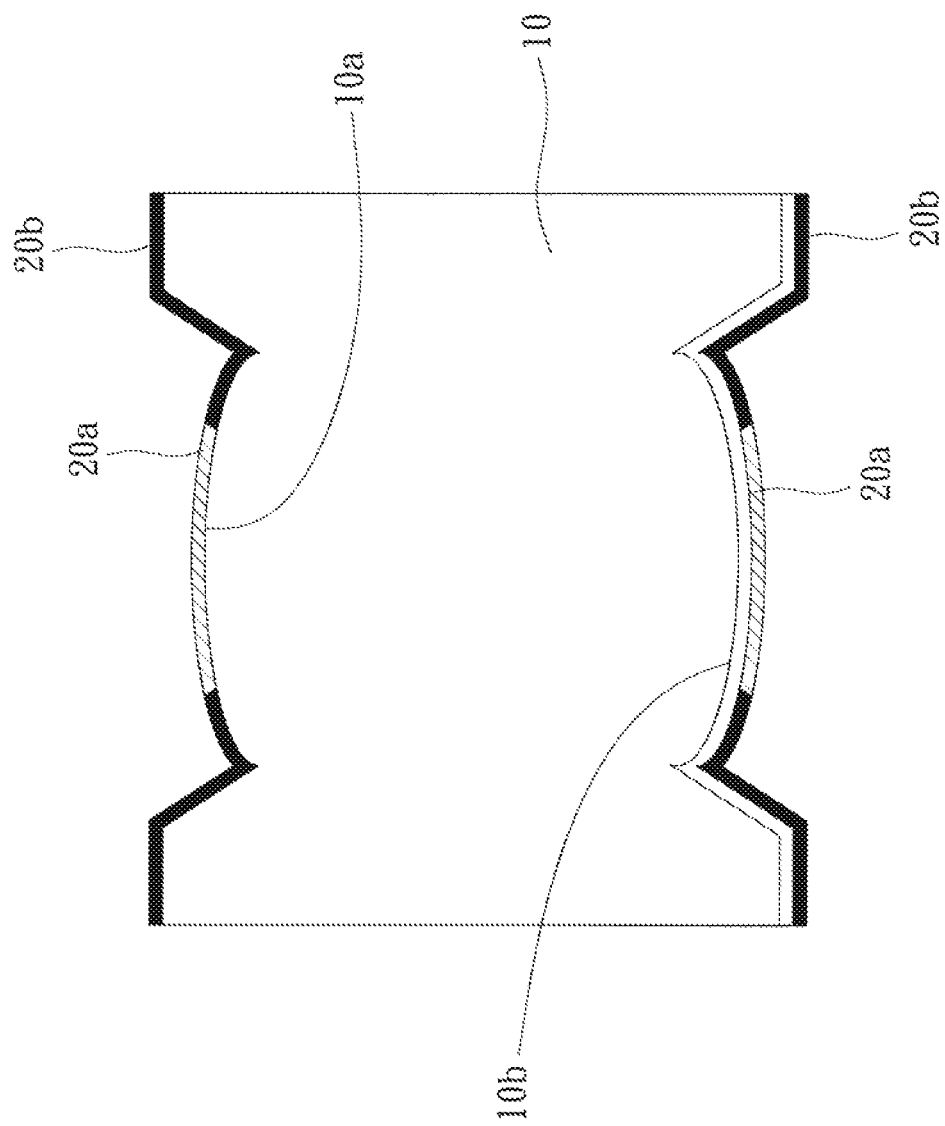
FIG. 4 is a sketch diagram of performing the step B of the method of the preferred embodiment of the present invention.

As shown in FIG. 2 to FIG. 4, a method of making an optical lens 1 of the preferred embodiment of the present invention uses optical lithography technique, which includes the following steps:

A. Coat shade layers 20 on opposite sides of a lens member 10. The lens member 10 is pre-made before the present invention which is made of a transparent material. The lens member 10 respectively has a lens portion 10a, 10b and a marginal portion on opposite sides thereof. The lens portions 10a, 10b may change the character of light emitting through the lens member 10, and the marginal portions respectively surround the lens portions 10a, 10b. The lens portions 10a, 10b may be convex, concave, or flat based on the optical requirement. The shade layers 20 cover the entire lens portions 10a, 10b and the marginal portions. The shade layers 20 are made of organic photoresist which has a strong bonding strength with the lens member 10. For a special purpose, the lens member 10 is coated with an optical film, such as infrared rays cut filter 30 before the shade layers 20. In a normal optical lens without any special purpose the step of coating the optical film may skip.

B. Develop the shade layers 20 by lithography development to respectively form a pattern on the shade layers 20. Each pattern includes an unnecessary portion 20a and a necessary portion 20b. The unnecessary portion 20a is on the lens portions 10a, 10b, and the rest part of the shade layer 20 is the necessary portion 20b to cover the marginal portion and a part of the lens portion 10a, 10b.

C. Remove the unnecessary portions 20a of the shade layers 20 to form an aperture on each shade layer 20, and therefore an optical lens 1 as shown in FIG. 2 is obtained. The remaining parts of the shade layers 20, the necessary portions 20b, are opaque so that light only enter the lens member through the aperture, therefore the shade layers 20 serve the function of apertures.

Figure 5:
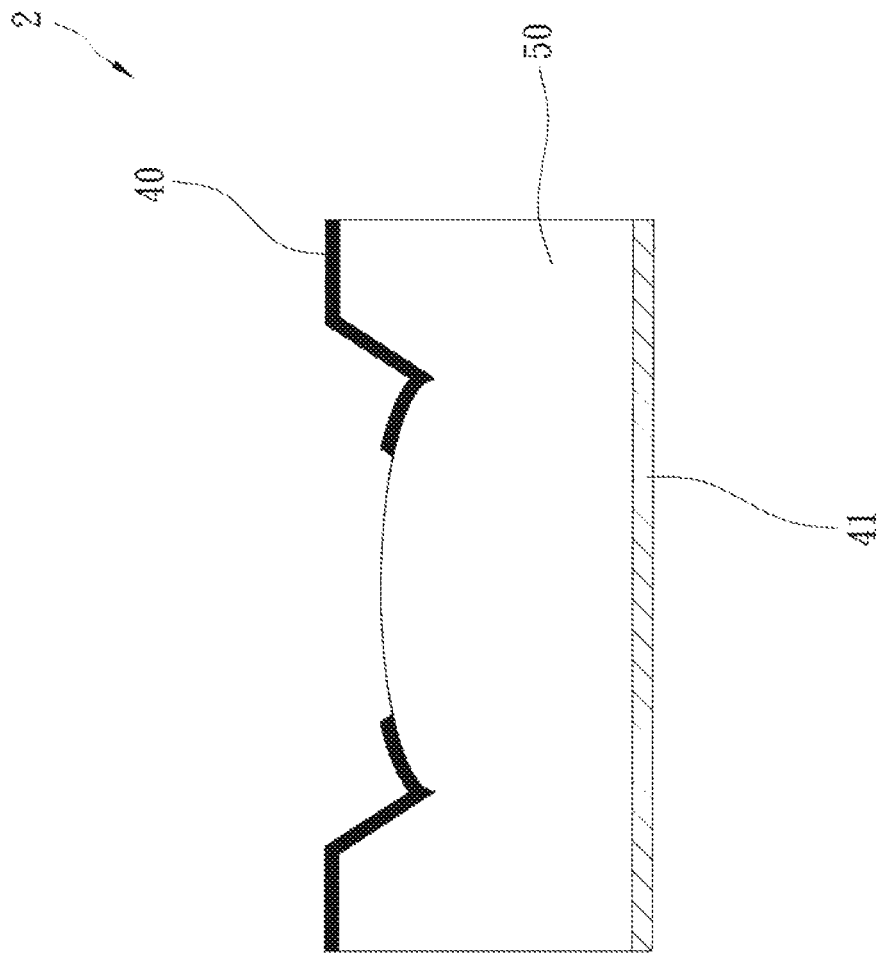
FIG. 5 is a sectional view of another optical lens of the present invention.

FIG. 5 shows another optical lens 2 of the present invention, which only has a shade layer 40 on a side of the lens member 50, and a infrared ray cut film 41 coated on the other side. The steps of a method of making the optical lens 2 are the same as above, except that it only has to process one side of the lens member. The description above is a few preferred embodiments of the present invention and the equivalence of the present invention is still in the scope of claim construction of the present invention.

What is claimed is:

1. An optical lens, comprising:
    a lens member, which is made of transparent material, having two lens portions on opposite sides thereof;
    an opaque shade layer provided on one of the two lens portions of the lens member to form an aperture; and
    an infrared ray cut film provided on the one of the two lens portions of the lens member, and the one of the two lens portions being a non-flat surface;
    wherein the infrared ray cut film is between the lens member and the shade layer;
    wherein the lens member further has a marginal portion surrounding the one of the lens portions, and the shade layer covers the marginal portion and a part of the one of the lens portions.

2. The optical lens as defined in claim 1, wherein the shade layer is made of organic material.

3. The optical lens as defined in claim 1, further comprising another opaque shade layer on the another one of the two lens portions of the lens member, wherein the another opaque shade layer also defines an aperture.

4. A method of making an optical lens, comprising the steps of:
    A. coating an infrared ray cut film on one side of a lens member and then coating a shade layer on the one side of the lens member;
    B. defining the shade layer with an unnecessary portion and a necessary portion; and
    C. removing the unnecessary portion of the shade layer to form an aperture;
    wherein the lens member respectively has two lens portions on the opposite sides thereof, the shade layer covers one of the lens portions of the lens member, at least one of the lens portions is a non-flat surface, and the infrared rays cut film is a non-flat one of the lens portions, the infrared ray cut film is between the lens member and the shade layer, the lens member further has a marginal portion surrounding the one of the lens portions, and the shade layer covers the marginal portion and a part of the one of the lens portions.

5. The method as defined in claim 4, wherein the shade layer is made of photoresist, and lithography development is performed to form the unnecessary portion and the necessary portion on the shade layer.

6. The method as defined in claim 4, wherein the shade layer is made of an organic material.

7. The method as defined in claim 4, wherein the lens member further has a marginal portion surrounding the one of the lens portions, and the shade layer covers the marginal portion and a part of the one of the lens portions.

* * * * *